United States Patent
Beller et al.

(10) Patent No.: US 11,475,339 B2
(45) Date of Patent: Oct. 18, 2022

(54) LEARNING UNFAMILIAR MEASUREMENT UNITS IN A DEEP QUESTION ANSWERING SYSTEM

(71) Applicant: International Business Machines Corporation, Armonk, NY (US)

(72) Inventors: Charles E. Beller, Baltimore, MD (US); Stephen A. Boxwell, Columbus, OH (US); Edward G. Katz, Washington, DC (US); Kristen M. Summers, Takoma Park, MD (US)

(73) Assignee: International Business Machines Corporation, Armonk, NY (US)

(*) Notice: Subject to any disclaimer, the term of this patent is extended or adjusted under 35 U.S.C. 154(b) by 622 days.

(21) Appl. No.: 16/557,366

(22) Filed: Aug. 30, 2019

(65) Prior Publication Data

US 2021/0065028 A1    Mar. 4, 2021

(51) Int. Cl.
*G06F 16/33* (2019.01)
*G06F 40/284* (2020.01)
*G06N 5/04* (2006.01)
*G06N 20/00* (2019.01)

(52) U.S. Cl.
CPC ......... *G06N 5/045* (2013.01); *G06F 16/3344* (2019.01); *G06F 40/284* (2020.01); *G06N 20/00* (2019.01)

(58) Field of Classification Search
CPC .... G06F 16/3344; G06F 40/284; G06F 40/30; G06N 20/00; G06N 3/08; G06N 5/045
See application file for complete search history.

(56) References Cited

U.S. PATENT DOCUMENTS

| 5,159,552 A | 10/1992 | van Gasteren et al. |
| 6,636,880 B1 | 10/2003 | Bera |
| 7,325,194 B2 | 1/2008 | Moore et al. |

(Continued)

OTHER PUBLICATIONS

Liu et al. (A PUT-Based Approach to Automatically Extracting Quantities and Generating Final Answers for Numerical Attributes, Entropy 2016, vol. 18, No. 235, 2016, pp. 1-14) (Year: 2016).*

(Continued)

*Primary Examiner* — Scott T Baderman
*Assistant Examiner* — Mario M Velez-Lopez
(74) *Attorney, Agent, or Firm* — Christopher M. Pignato

(57) ABSTRACT

A method utilizes a deep question answering (QA) system to provide an answer, to a certain type of question, that includes an unfamiliar measurement unit. An answer key is utilized to train a DeepQA system to search for passages that answer a certain type of question, where the DeepQA system outputs an answer key value and an answer key measurement unit that is associated with the answer key value. The method identifies a candidate answer that includes a candidate passage containing the answer key value but not the answer key measurement unit, where a candidate passage measurement unit in the candidate passage is associated with the answer key value. The method then matches the answer key measurement unit to the candidate passage measurement unit based on the answer key measurement unit and the candidate passage measurement unit both being associated with the answer key value.

19 Claims, 8 Drawing Sheets

(56) References Cited

U.S. PATENT DOCUMENTS

| | | | |
|---|---|---|---|
| 7,788,306 | B2 | 8/2010 | Dykes et al. |
| 9,199,723 | B2* | 12/2015 | Yamasaki ............ G05D 1/0055 |
| 9,569,724 | B2 | 2/2017 | Ferucci et al. |
| 10,108,904 | B2 | 10/2018 | Bagchi et al. |
| 2004/0068528 | A1 | 4/2004 | Erickson |
| 2012/0330934 | A1 | 12/2012 | Duboue et al. |
| 2016/0180726 | A1* | 6/2016 | Ahuja .................... G06N 5/022 434/322 |
| 2017/0215028 | A1 | 7/2017 | Rhoads et al. |
| 2017/0372190 | A1 | 12/2017 | Bishop et al. |
| 2018/0011837 | A1* | 1/2018 | Beller ................. G06F 16/3329 |
| 2019/0047715 | A1* | 2/2019 | Hedrick .................. G08G 5/04 |
| 2020/0364511 | A1* | 11/2020 | Brown .................. G06N 3/006 |
| 2021/0064964 | A1 | 3/2021 | Katz |
| 2021/0200954 | A1* | 7/2021 | Dsouza ............... G06N 3/0445 |
| 2022/0147544 | A1* | 5/2022 | Simard .................. G06N 20/00 |

OTHER PUBLICATIONS

Ferrucci, D., et al., "Building Watson: An Overview of the DeepQA Project", 2010, AI Magazine, 31(3), 59-79. https://doi.org/10.1609/aimag.v31i3.2303.

List of IBM Patents or Patent Applications Treated as Related, Sep. 11, 2019.

P. Mell et al., "The NIST Definition of Cloud Computing", National Institute of Standards and Technology, Information Technology Laboratory, Sep. 2011, pp. 1-7.

Tamames, Javier et al. "Envmine: A Text-Mining System for the Automatic Extraction of Contextual Information." BMC Bioinformatics 11.1 (2010): 294, pp. 1-10.

A. Neelakantan et al., "Learning Dictionaries for Named Entity Recognition Using Minimal Supervision", <https://arxiv.org/abs/1504.06650>, In 14th Conference of the European Chapter of the Association for Computational Linguistic, 2014, submitted Apr. 24, 2015, pp. 1-10.

S. Ercan, "Question Answering With the Robotutor Nao", Delft University of Technology, Thesis, Aug. 17, 2017, 90 Pages.

P. Yin et al., "Answering Questions With Complex Semantic Constraints on Open Knowledge Bases", ACM, CIKM'15, 2015, pp. 1-10.

Anonymous, "Method of Computing Relevancy Score in a Question and Answering System", ip.com, IPCOM000222407D, Oct. 2, 2012, pp. 1-4.

Anonymous, "System and Method To Generate User Profiles Based on Question and Answer Nterchange", ip.com, IPOM000238977D, Sep. 29, 2014, pp. 1-5.

Anonymous, "A Self-Diagnosing Question Answering System", ip.com, IPCOM000247244D, Aug. 17, 2016, pp. 1-6.

Anonymous, "Automatic Error Analysis Advisor for Question Answering Systems", ip.com, IPCOM000247245D, Aug. 17, 016, pp. 1-6.

Dua et al., "DROP: A Reading Comprehension Benchmark Requiring Discrete Reasoning Over Paragraphs", arXiv:1903.00161tv2 [cs.CL],Apr. 16, 2019, pp. 1-12.

Gruss et al., "By the numbers: The magic of numerical intelligence in text analytic systems", Decision Support Systems, vol. 113, 2018, pp. 86-98.

Schierman et al., "Adaptive Guidance with Trajectory Reshaping for Reusable Launch Vehicles", AIAA Guidance, Navigation, and Control Conference and Exhibit, Aug. 5-8, 2022, Monterey, California, 11 pages.

* cited by examiner

LEARNING UNFAMILIAR MEASUREMENT UNITS IN A DEEP QUESTION ANSWERING SYSTEM

BACKGROUND

The present invention relates to the field of question answering systems. Still more specifically, the present invention relates to the field of handling unfamiliar measurement units when using a deep question answering system to answer a certain type of question.

SUMMARY

In an embodiment of the present invention, a method utilizes a deep question answering (QA) system to provide an answer, to a certain type of question, in which the answer includes an unfamiliar measurement unit. An answer key is utilized to train a deep question answering (DeepQA) system to search for passages that answer a certain type of question, where the DeepQA system outputs an answer key value and an answer key measurement unit that is associated with the answer key value. The method identifies a candidate answer that includes a candidate passage containing the answer key value but not the answer key measurement unit, where a candidate passage measurement unit in the candidate passage is associated with the answer key value. The method then matches the answer key measurement unit to the candidate passage measurement unit based on the answer key measurement unit and the candidate passage measurement unit both being associated with the answer key value. The DeepQA system is retrained to retrieve answers, for the certain type of question, that include one or more of the answer key measurement unit and the candidate passage measurement unit. The retrained DeepQA system receives another example of the certain type of question, retrieves at least one passage that includes the answer key value and one or more of the answer key measurement unit and the candidate passage measurement unit, and answers the other example of the certain type of question with the passage that includes the answer.

In one or more embodiments, the method(s) described herein are performed by an execution of a computer program product and/or a computer system.

DETAILED DESCRIPTION

Figure 1:
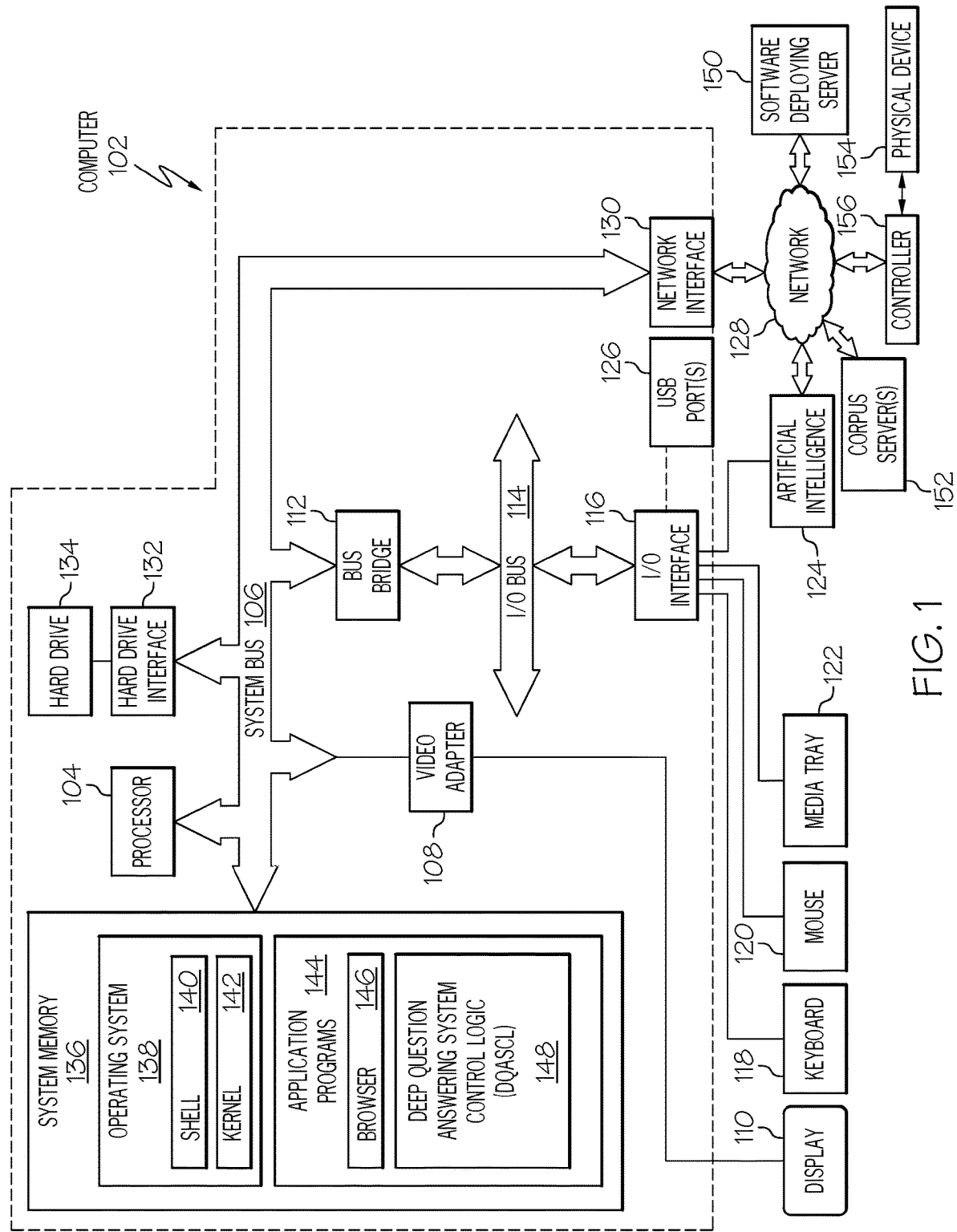
FIG. 1 depicts an exemplary system and network in which the present invention is implemented in various embodiments.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that can be utilized by and/or in the implementation of the present invention. Note that some or all of the exemplary architecture, including both depicted hardware and software, shown for and within computer 102 can be utilized by artificial intelligence 124 and/or software deploying server 150 and/or corpus server(s) 152 and/or physical device 154 and/or controller 156 shown in FIG. 1, and/or deep question answering system 302 shown in FIG. 3, and/or one or more of the neurons/nodes shown in the neural networks depicted in FIG. 4 and/or FIG. 5.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), an artificial intelligence 124, and external USB port(s) 126. While the format of the ports connected to I/O interface 116 can be any known to those skilled in the art of computer architecture, in one embodiment some or all of these ports are universal serial bus (USB) ports.

As depicted, computer 102 is able to communicate with a software deploying server 150 and/or the corpus server(s) 152 and/or the physical device 154 (via the controller 156) and/or the artificial intelligence 124 using a network interface 130 to a network 128. Network interface 130 is a hardware network interface, such as a network interface card (NIC), etc. Network 128 can be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Deep Question Answering System Control Logic (DQASCL) 148. DQASCL 148 includes code for implementing the processes described below, including those described in FIGS. 2-6. In one embodiment, computer 102 is able to download DQASCL 148 from software deploying server 150, including in an on-demand basis, wherein the code in DQASCL 148 is not downloaded until needed for execution. Note further that, in one embodiment of the present invention, software deploying server 150 performs all of the functions associated with the present invention (including execution of DQASCL 148), thus freeing computer 102 from having to use its own internal computing resources to execute DQASCL 148.

Also connected to computer 102 is a physical device 154, which is controlled by a controller 156. One or more examples of physical device 154 are presented below.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

Deep Question Answering (DeepQA) systems are trained by question answer pairs like the following:

Question: What is the minimum approach speed for Aircraft X when the alert "RUDDER ASSIST DISABLED" is displayed?

Training Answer Key: 141 knots

That is, certain types of aircraft have two ways of controlling their rudder: manual and power assisted (hydraulic). Manual control of the rudder gives the pilot excellent tactile feedback, and is often preferred while at cruising speed, since only small movements of the rudder are required (or even allowed) at higher speeds to make the aircraft yaw (rotate about its vertical axis). However, at lower speeds, such as when the aircraft is taking off or landing, larger movements of the rudder movement are needed make the aircraft yaw. As such, power assist is needed when taking off or landing the aircraft. Many aircraft have a minimum speed at which the power assist is needed. That is, although the aircraft might be landed at a higher speed, depending on the length of the runway, headwind, etc., making manual rudder control acceptable, under slower landing speeds, the power assist for the rudder is needed to cause the rudder to have greater movement.

Stated another way, if the aircraft is going slower than 141 knots when landing or taking off, then it must have power assistance for moving the rudder, such that the rudder will have enough movement to control the aircraft when landing/taking off at such low speeds. If the power assistance for the rudder is turned off, then a "RUDDER ASSIST DISABLED" alert is shown in the cockpit.

Therefore, the DeepQA system will look for a passage from a corpus of information (e.g., text documents, webpages, etc.) that includes key phrases, as contextually determined from the question. In this example, the key phrases could be "approach", "speed", "Aircraft X", and "RUDDER ASSIST DISABLED". In addition, assume that the DeepQA system has been trained to look for the key measurement unit "knots" when looking for information about speed and aircraft. That is, a measurement unit is defined herein as a metric (e.g., knots, mile, ounce, etc.) that is used to identify what a value is describing. Thus, in the term "141 knots", "knots" is the measurement unit, and "141" is the value that is described by "knots".

In the example described above, if the DeepQA system were able to find a document that states, "The minimum approach speed for Aircraft X when the alert "RUDDER ASSIST DISABLED" is displayed is 141 knots", then returning the answer "141 knots" is a simple task.

However, there are times when the corpus contains measurement units that are unfamiliar to the DeepQA system.

For example, consider a first candidate passage for answering the question "What is the minimum approach speed for Aircraft X when the alert "RUDDER ASSIST DISABLED" is displayed?":

Do not conduct autoland operations when on approach in Aircraft X if "RUDDER ASSIST DISABLED" alert is displayed, airport field elevation exceeds 8,000 MSL, or knots reading is too low.

This passage does not answer the question "What is the minimum approach speed for Aircraft X when the alert "RUDDER ASSIST DISABLED" is displayed?", but the DeepQA system might return it anyway, since it includes the key terms "approach", "Aircraft X", and "RUDDER ASSIST DISABLED", and the term "knots" is also part of the passage and/or metadata for the passage.

Consider now a second candidate passage for answering the question "What is the minimum approach speed for Aircraft X when the alert "RUDDER ASSIST DISABLED" is displayed?":

Do not attempt an approach or missed approach in Aircraft X if at less than 141 KIAS when "RUDDER ASSIST DISABLED" alert is displayed.

This second candidate passage is an excellent source for answering the question "What is the minimum approach speed for Aircraft X when the alert "RUDDER ASSIST DISABLED" is displayed?", but it does not include the terms "speed" or "knots". That is, rather than use the term "knots" (which is shorthand for nautical miles per hour), the passage uses the term KIAS, which is an acronym for "knots indicated airspeed" (KIAS).

KIAS is an airspeed reading whose value is adjusted for current air density, pressure, humidity, altitude, etc., and thus is often more useful to the pilot than the uncalibrated "knots". However, the DeepQA system is unfamiliar with the term KIAS, and thus initially does not know what type of measurement unit ("speed") it is.

Returning to the example above, since the second candidate passage does not include "speed" or "knots", the DeepQA system will use the first candidate passage, and generate the answer:

Airport field elevation exceeds 8,000 feet MSL.

This passage, although logical to the DeepQA system, does not answer the question "What is the minimum approach speed for Aircraft X when the alert "RUDDER ASSIST DISABLED" is displayed?"

As such, deep QA systems in the prior art often fail to generate, or fail to score highly, excellent answers to questions due to a reliance on restrictive (but incomplete) type information from lexical answer type (LAT) detection and answer generation modules. That is, LAT detection uses the context of a question to determine what it is asking about (e.g., operational parameters of an aircraft), and answer generation modules provide candidate answers to this question. However, if a prior art deep QA system finds a term in a candidate answer that uses a measurement unit with which it is unfamiliar (e.g., KIAS), then it can ignore that term, and/or heavily discount that candidate answer.

Figure 2:
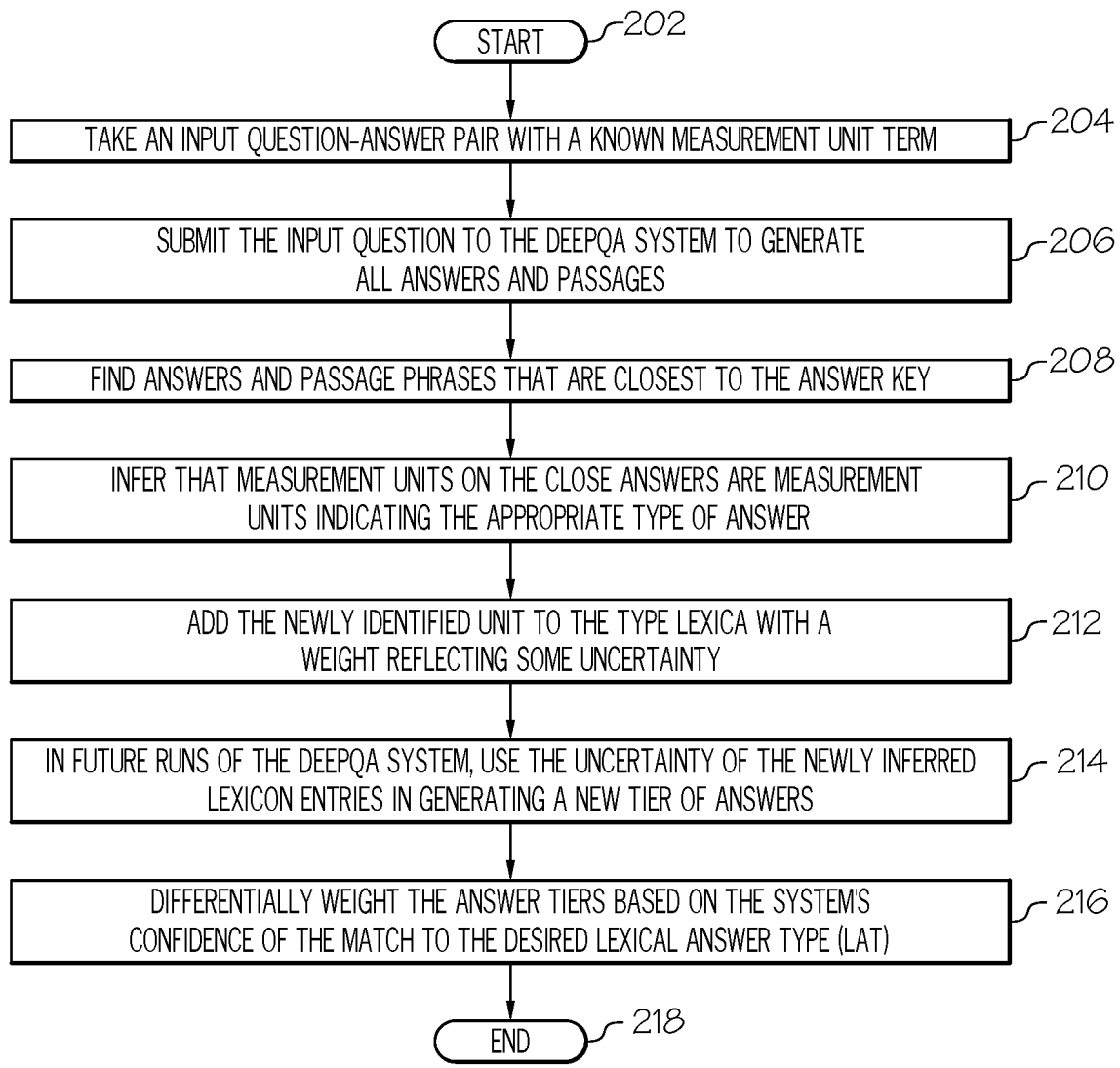
FIG. 2 is a high-level flow chart of one or more steps performed in accordance with one or more embodiments of the present invention.

With reference now to FIG. 2, a high-level overview of steps performed in one or more embodiments of the present invention is presented.

After initiator block 202, an input Question-Answer pair with a known measurement unit term is received, as shown in block 204. For example, the Question-Answer pair could be:

Question: What is the minimum approach speed for Aircraft X when the alert "RUDDER ASSIST DISABLED" is displayed?
Answer: 141 knots Use of the Question-Answer pair can occur at training time or during a post-hoc error analysis procedure. However, at run-time the QA system only has access to the question (and candidate answers).

As shown in block 206, the input question (e.g., a same type of question, such as "What is the minimum approach speed for Aircraft X when the alert "RUDDER ASSIST DISABLED" is displayed?", but not the same question itself) is input into the DeepQA system (i.e., the DeepQA system) to generate all answers and passages for that question. That is, the question used to train the DeepQA system could have been "What is the minimum approach speed for Aircraft X when the alert "RUDDER ASSIST DISABLED" is displayed?", but the question entered at run-time could be "How fast should Aircraft X be going when landing in order for it to be acceptable for "RUDDER ASSIST DISABLED" to be displayed?" Thus, these two questions are the same type of question (according to their lexical answer type—LAT), but ask similar questions in different ways. However, both questions ask about the aircraft speed at which rudder power assistance is needed during landing/takeoff.

As described in block 208, the DeepQA system then finds answers (i.e., passage phrases that answer the new question) that are closest to the answer key. Access to the answer key occurs only during training or as part of a post-hoc error analysis procedure, and thus is not directly available when answering the new question. Nonetheless, the DeepQA system is looking for an answer that is "close" to that found in the answer key.

In the example above, where both the provided answer (141 knots) and the passage generated phrase (141 KIAS) share a numeric prefix, they lack an exact match. However, they both include the value "141".

In another embodiment, the numbers do not exactly match, but they are close in value. For example, the value "143" is within a predefined range (e.g., 2) of the training value "141".

In another embodiment, the numbers do not match, but they are multiples of one another. More specifically, round multiples of the number (e.g., 2x, 3x, 4x, etc.) are considered as good answers, on the theory that a new value is likely to be some round multiple of a known one.

If close numbers and no round multiples of the number are found, then the DeepQA system considers, as candidate answers, terms in which follow-on numbers occur frequently. For example, assume that the term from the answer key is "141 knots", which is not found in the candidate documents. However, assume that hundreds, if not thousands, of candidate answers have the same value/measurement unit "141 KIAS". As such, this high frequency is used to determine that "knots" and "KIAS" are both related to aircraft speed.

In one or more embodiments of the present invention, some or all of the above strategies are used and associated with different uncertainty weights. For example, a passage with a value that is within a predefined range (i.e., "143" is only two away from "141") can be weighted more heavily than a passage with a value that is a round multiple of "141", which is weighted more heavily than a passage with a value and measurement unit that is frequently used.

As shown in block 210, the DeepQA system infers that measurement units on the close answers are measurement units indicating the appropriate type of answer. That is, if the values are close, or are a multiple of one another, or the other values/measurement units are used very frequently, then an inference is drawn that their respective measurement units ("knots" and "KIAS") both are measurements of airspeed.

As shown in block 212, the DeepQA system then adds the newly identified measurement unit (e.g., "KIAS") to the type lexica with a weight reflecting some uncertainty as to whether the newly identified measurement unit actually is the same type of measurement (as ascertained in block 210).

As described in block 214, now that the DeepQA system is trained to recognize the newly identified measurement unit, in future runs the DeepQA system uses the uncertainty of the newly inferred lexicon entries in generating a new tier of answers, in which the weighting described in block 212 is part of the run-time processing.

Even if the input question generates a structured answer set that includes the following ranked tiers of answers:

{8,000 feet MSL}>{141 KIAS}>all the numbers>all the noun-phrases which would be in error (since "8,000 feet MSL" is not the answer that is relevant to the question about aircraft landing speed and rudder control), the system can still differentially weight the answer tiers based on the system's confidence of the match to the desired lexical answer type (LAT), as described in block 216.

That is, since the DeepQA system now has a middle tier of generated answers between "things it is sure of" and "all the things", the DeepQA system can use a step-function penalty to give uniform decremental weighting to each less certain tier (e.g., a 10/20/30 percent penalty for each subsequent answer tier). In a preferred embodiment, the DeepQA system includes confidence scores in the lexica (terms that might describe a same concept, such as airspeed), the DeepQA system makes use of those scores to scale the system's overall confidence in the generated answer.

Figure 3:
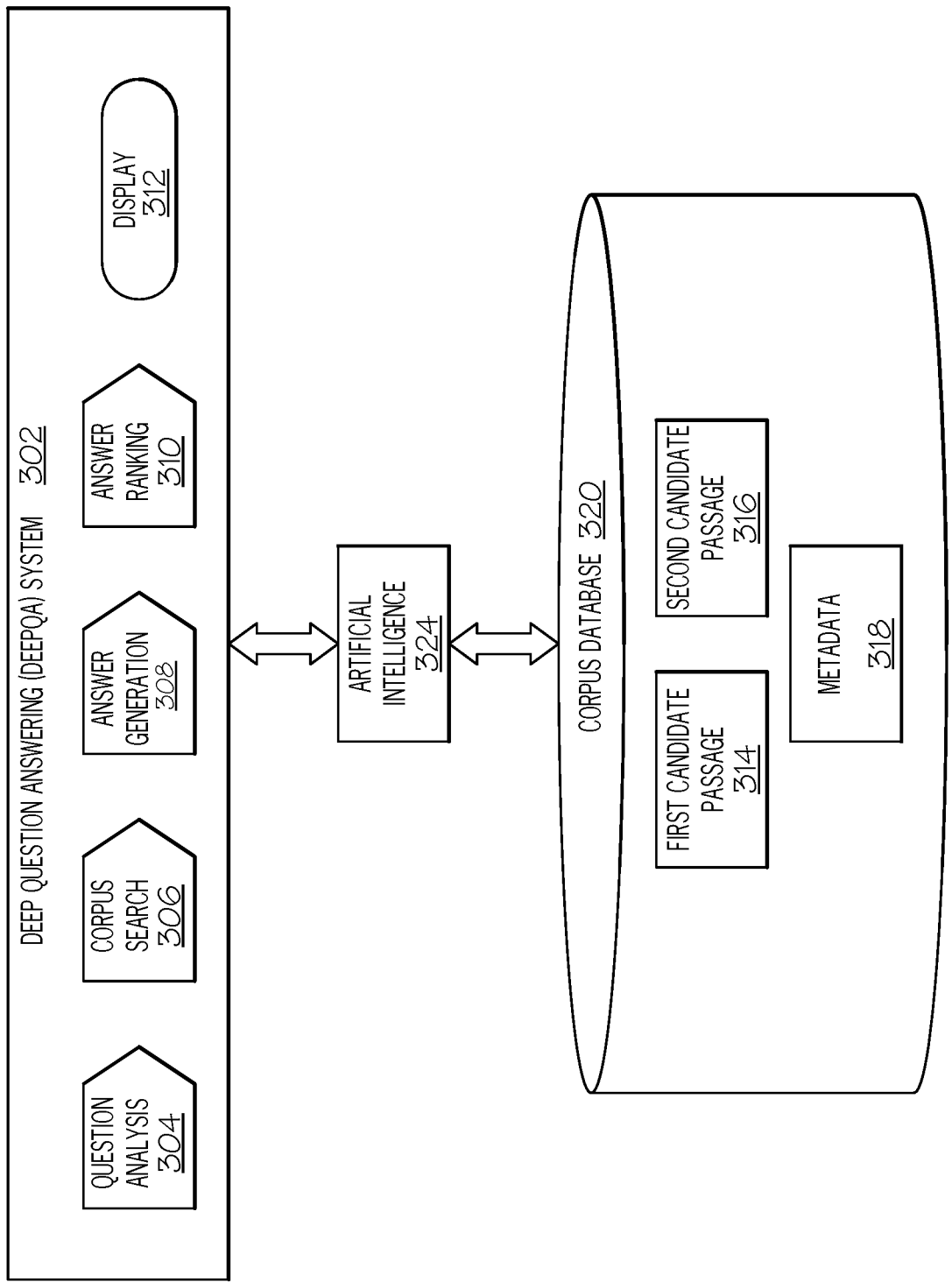
FIG. 3 illustrates a high-level overview of one or more embodiments of the present invention.
Figure 4:
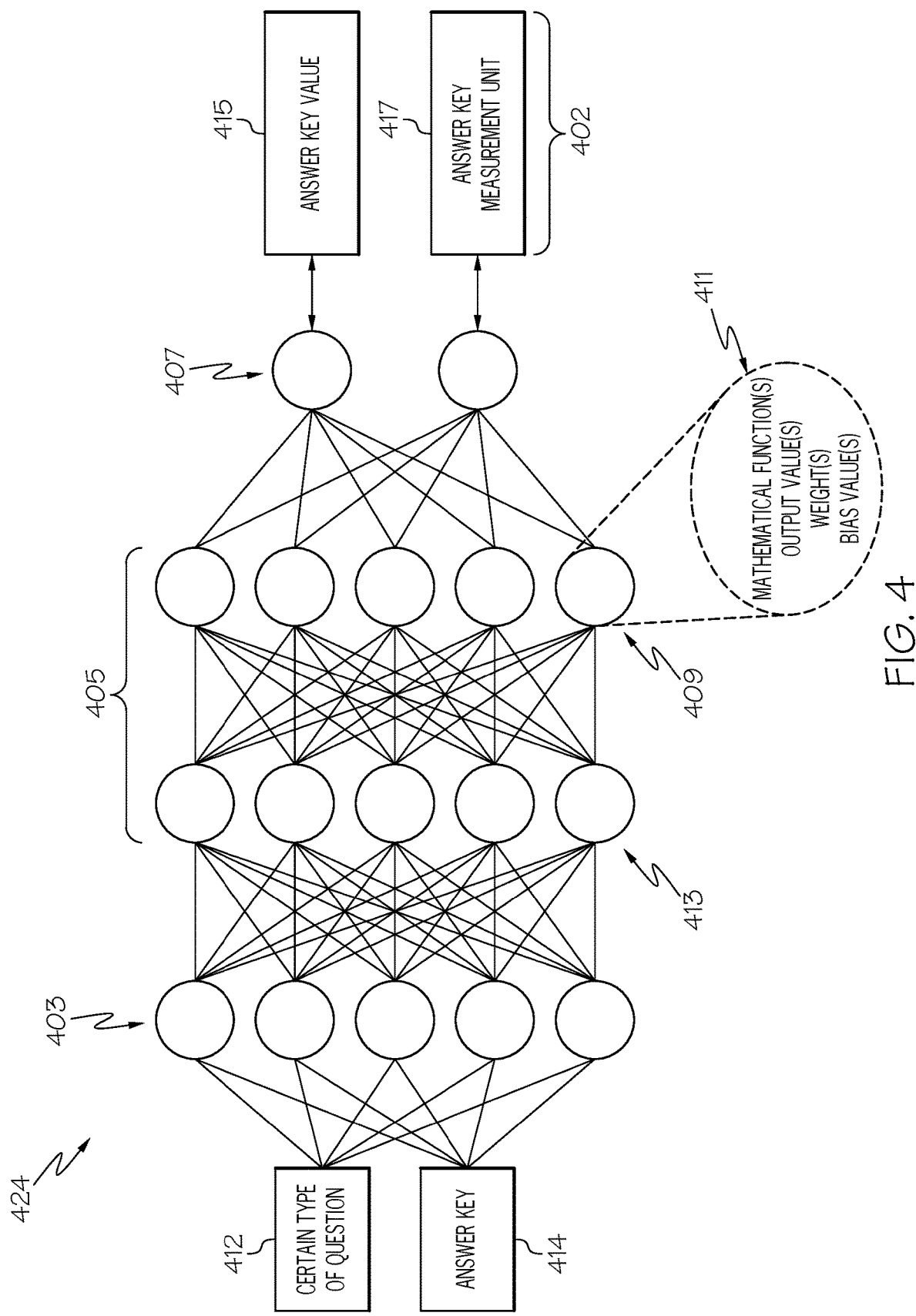
FIG. 4 and FIG. 5 depict exemplary deep neural networks as used in one or more embodiments of the present invention.
Figure 5:
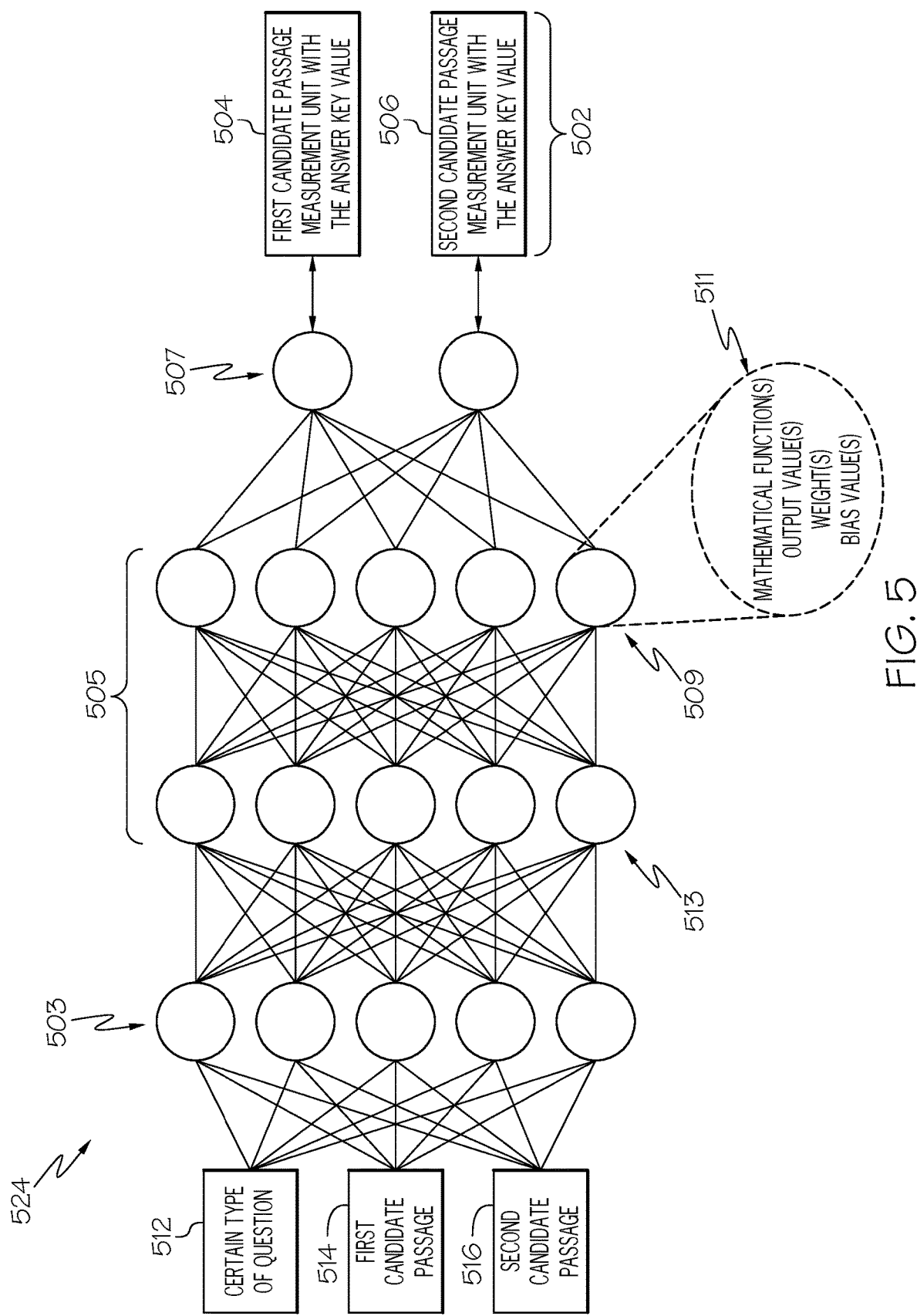

With reference now to FIGS. 3-5, details of one or more embodiments of the DeepQA system of the present invention is presented.

As shown in FIG. 3, a deep question answering (DeepQA) system 302 performs five basic steps. DeepQA system 302 is a system that mines structured and/or unstructured information sources to answer a query/question.

First, as shown in block 304, the DeepQA system 302 analyzes a received question. For example, assume that a client (e.g., using a webpage that is supported by DeepQA system 302) enters the question, "What is the minimum approach speed for Aircraft X when the alert "RUDDER ASSIST DISABLED" is displayed?" The question analysis shown in block 304, using a natural language processing (NLP) algorithm, will determine that the question is asking about aircraft speed parameters when landing a particular aircraft. Some or all of these parameters can be part of metadata 318, which is associated with candidate passages within a corpus database 320 of documents, in order to initially identify the candidate passages. For example, any candidate passage with the metadata "Aircraft X" and "RUDDER ASSIST DISABLED" will be considered to be candidate answers/passages.

As shown in block 306, the DeepQA system 302 then searches corpuses (i.e., bodies of information) from the corpus database 320, such as the first candidate passage 314 and the second candidate passage 316. For example, assume that metadata 318 associated with both the first candidate passage 314 and the second candidate passage 316 include the metadata "Aircraft X" and "RUDDER ASSIST DISABLED".

For illustrative purposes, assume again that first candidate passage 314 states, "Do not conduct autoland operations when on approach in Aircraft X if "RUDDER ASSIST DISABLED" alert is displayed, airport field elevation exceeds 8,000 MSL, or knots reading is too low."; and second candidate passage 316 states, "Do not attempt an approach or missed approach in Aircraft X if at less than 141 KIAS when "RUDDER ASSIST DISABLED" alert is displayed."

As shown in block 308, the DeepQA system 302 then generates multiple answers (in this example, two) to the question "What is the minimum approach speed for Aircraft X when the alert "RUDDER ASSIST DISABLED" is displayed?", including "Airport field elevation exceeds 8,000 feet MSL" and "141 KIAS". The generation of these answers (answer generation 308) and/or the ranking of the answers (answer ranking 310) is performed by artificial intelligence 324.

The ranked answers are then presented on a display 312.

In one or more embodiments, the present invention uses an electronic neural network, which is an example of the artificial intelligence 324 shown in FIG. 3, to identify correlations between answers and their measurement units.

In various embodiments of the present invention, the artificial intelligence 324 shown in FIG. 3 is a Deep Neural Network (DNN), a Convolutional Neural Network (CNN), and/or another type of machine learning system, including but not limited to a decision tree, a support vector machine, a Bayesian network, etc. In a preferred embodiment, a Deep Neural Network is used to evaluate text/numeric data in a document from the corpus database 320, while a CNN is used to evaluate an image from the corpus database 320.

A CNN is similar to a DNN in that both utilize interconnected electronic neurons. However, a CNN is different from a DNN in that 1) a CNN has neural layers whose sizes are based on filter sizes, stride values, padding values, etc., and 2) a CNN utilizes a convolution scheme to analyze image data. A CNN gets its "convolutional" name based on a convolution (i.e., a mathematical operation on two functions to obtain a result) of filtering and pooling pixel data (a mathematical operation on two functions) in order to generate a predicted output (obtain a result).

As such, a preferred embodiment of the present invention utilizes a Deep Neural Network.

Logic units within an electronic neural network, including a Deep Neural Network, are referred to as "neurons" or "nodes". If the electronic neural network is implemented entirely in software, then each neuron/node is a separate piece of code (i.e., instructions that perform certain actions).

If the electronic neural network is implemented entirely in hardware, then each neuron/node is a separate piece of hardware logic (e.g., a processor, a gate array, etc.). If the electronic neural network is implemented as a combination of hardware and software, then each neuron/node is a set of instructions and/or a piece of hardware logic.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are often only "excitatory" to varying degrees.

In an electronic neural network, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often one or more nodes for holding vector information.

With reference now to FIG. 4, a Deep Neural Network (DNN) 424 used to evaluate text data in one or more embodiments of the present invention is presented. For example, assume, for illustrative purposes, that a certain type of question 412 is the training question described above, "What is the minimum approach speed for Aircraft X when the alert "RUDDER ASSIST DISABLED" is displayed?" Assume also that the answer key 414 is "141 knots". As such, the certain type of question 412 and the answer key 414 are entered into the input layer 403 of the deep neural network 424 in order to train the DNN 424 to output the answer key value 415 ("141") and the answer key measurement unit 417 ("knots").

As shown in FIG. 4, the electronic neurons in DNN 424 are arranged in layers, known as the input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often multiple nodes, each of which holds vector information. In an embodiment of the present invention, each neuron in the output layer 407 is associated with a particular response from output 402, as shown in FIG. 4.

As just mentioned, each node in the depicted DNN 424 represents an electronic neuron, such as the depicted neuron 409. As shown in block 411, each neuron (including neuron 409) includes multiple features, such as: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the DNN 424 to be further "fine tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the DNN 424, such that a reliable output will result from output layer 407. Such adjustments are alternatively performed manually or automatically.

When manually adjusted, the weights and/or biases are adjusted by the user in a repeated manner until the output from output layer 407 matches expectations. For example, assume that DNN 424 is being trained to generate the answer key value 415 (e.g., "141") and the answer key measurement unit 417 ("knots") when the certain type of question 412 (i.e., about the state of a rudder on an aircraft when landing) and the answer key 414 ("141 knots") is entered into input layer 403. As such, when input layer 403 receives the certain type of question 412 and the answer key 414 during training, then the neurons within the deep neural network 424 are adjusted such that the deep neural network 424 outputs the answer key value 415 ("141") and the answer key measurement unit ("knots").

When automatically adjusted, the mathematical functions, output values, weights, and/or biases are adjusted using "back propagation", in which a "gradient descent" method determines how each mathematical function, output value, weight, and/or bias should be adjusted in order to provide an output 402 that is accurate (as determined by a subject matter expert reviewer, and/or other analytical software).

The output 402 can be values/measurement units, as described herein, and/or a physical action event. For example, assume that the deep neural network 424 controls a physical aircraft. Assume further that, when trained, the deep neural network 424 is able to recognize that the aircraft is flying too slow to use manual control of its rudder. As such, the deep neural network 424 (e.g., artificial intelligence 124 shown in FIG. 1) will automatically activate the auto-assist (hydraulic) system for controlling the rudder by issuing instructions to controller 156 shown in FIG. 1, thus controlling the rudder (physical device 154).

Once the deep neural network 424 shown in FIG. 4 is trained using the certain type of question 412 and the answer key 414, it is now ready to become a retrained deep neural network 524, as shown in FIG. 5, and can be used to locate answers to similar types of questions as the certain type of question 412 used in training.

That is, and as described above, the certain type of question 412 could have been "What is the minimum approach speed for Aircraft X when the alert "RUDDER ASSIST DISABLED" is displayed?", while the certain type of question 512 used at runtime could be "How fast should Aircraft X be going when landing in order for it to be acceptable for "RUDDER ASSIST DISABLED" to be displayed?" Both questions are taxonomically related to the question about how fast the aircraft needs to be flying if the rudder is to be controlled manually.

Thus, the retrained deep neural network 524 becomes retrained to look for the answer key value 415 ("141") and the answer key measurement unit 417 ("knots") or another equivalent measurement unit in answers to the certain type of question 512.

As such, the retrained deep neural network 524 uses as inputs a first candidate passage 514 (analogous to the first candidate passage 314 shown in FIG. 3) and a second candidate passage 516 (analogous to the second candidate passage 316 shown in FIG. 3). As described above, the first candidate passage 514 is about the elevation of a landing strip, but the (correct) second candidate passage 516 uses the term "KIAS" instead of "knots".

However, while the input layer 503, hidden layers 505, output layer 507, neuron 513, and neuron 509 in FIG. 5 are similar to their respective input layer 403, hidden layers 405, output layer 407, neuron 413, and neuron 409 in FIG. 4, the elements in block 511 have now been adjusted to align terms that use "KIAS" with "knots" since they 1) have the same value (e.g., "141") as the key; 2) have a value ("142") that is close to that in the key ("141); and/or 3) are used by more candidate passages than any other measurement term. That is, one or more of the features in block 511 have been adjusted, while retraining the deep neural network 424 to become the retrained deep neural network 524, to recognize that "KIAS", which was previously unrecognized, is now recognized as being a measurement unit for describing speed, just as "knots" does.

This allows the retrained deep neural network 524 to output one or more outputs in output 502, including the first candidate passage measurement unit with the answer key value (e.g., "141 KIAS") and a second candidate passage measurement unit without the answer key value (e.g., "8,000 feet MSL"). The second candidate passage measurement unit without the answer key value 506 is thus ranked lower than the first candidate passage measurement unit with the answer key value 504 by the retrained deep neural network 524, and is ranked accordingly by the answer ranking 310 shown in FIG. 3, and displayed on the display 312 accordingly.

Figure 6:
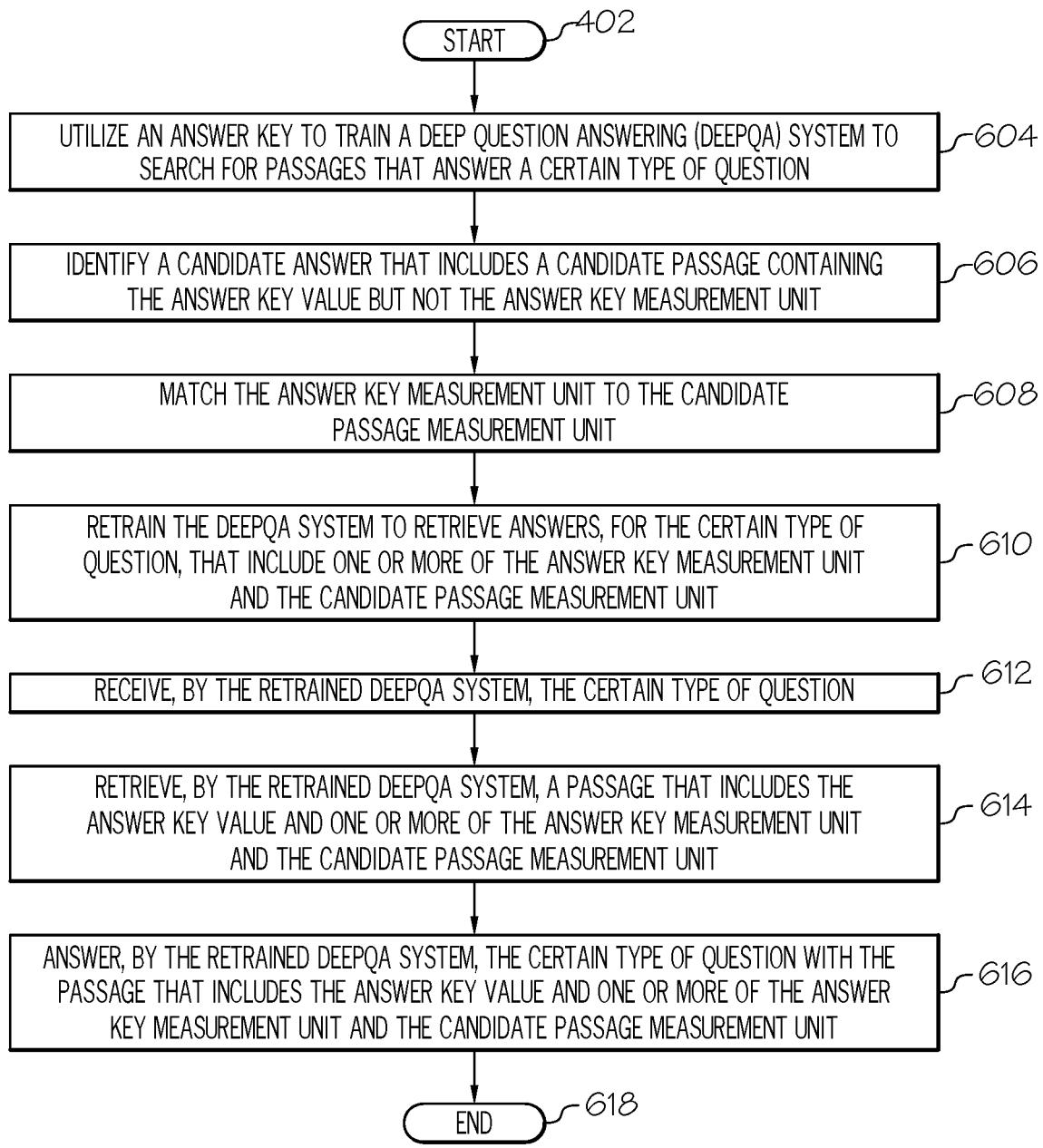
FIG. 6 is another high-level flow chart of one or more steps performed in accordance with one or more embodiments of the present invention.

With reference now to FIG. 6, a high-level flow chart of one or more embodiments of the present invention is presented.

After initiator block 602, one or more processors (e.g., processor 104 in computer 102) and/or a user utilize an answer key to train a deep question answering (QA) system to search for passages that answer a certain type of question, as described in block 604. As described herein and illustrated in FIG. 4, the DeepQA system outputs an answer key value and an answer key measurement unit that is associated with the answer key value.

As described in block 606, the processor(s) and/or user identify a candidate answer (e.g., second candidate passage 316 shown in FIG. 3) that includes a candidate passage containing the answer key value (e.g., "141") but not the answer key measurement unit (e.g., "knots"). Thus, the candidate passage measurement unit (e.g., "KIAS"), and not the answer key measurement unit (e.g., "knots"), is associated with the answer key value (e.g., "141").

As described in block 608, the processor(s) and/or user match the answer key measurement unit to the candidate passage measurement unit based on the answer key measurement unit and the candidate passage measurement unit both being associated with the answer key value. For example, the answer key measurement unit (e.g., "knots") and the candidate passage measurement unit (e.g., "KIAS") both describe/are associated with the answer key value "141".

As described in block 610, the processor(s) and/or user retrain the DeepQA system to retrieve answers, for the certain type of question, that include one or more of the answer key measurement unit and the candidate passage measurement unit. That is, the retrained deep neural network 524 shown in FIG. 5 (which was retrained according to the description provided with FIG. 4) is now able to retrieve answers that have one or more of the answer key measurement unit (e.g., "knots") and the candidate passage measurement unit (e.g., "KIAS").

As described in block 612, the retrained DeepQA system receives the certain type of question (e.g., a question about aircraft landing speed and rudder control). For example, the training question might have been "What is the minimum approach speed for Aircraft X when the alert "RUDDER ASSIST DISABLED" is displayed?", while the runtime question might be "How fast should Aircraft X be going when landing in order for it to be acceptable for "RUDDER ASSIST DISABLED" to be displayed?" Nonetheless, they are both the same certain type of question 512 (i.e., a question about aircraft landing speed and rudder control).

As described in block 614, the retrained DeepQA system retrieves a passage that includes the answer key value and one or more of the answer key measurement unit and the candidate passage measurement unit. That is, the retrained DeepQA system returns passages/answers that include the answer key's value (e.g. "141") along with either the answer key measurement unit (e.g., "knots") or the candidate passage measurement unit (e.g. "KIAS").

As described in block 616, the retrained DeepQA system answers the certain type of question with the passage that includes the answer key value and one or more of the answer key measurement unit and the candidate passage measurement unit, and returns it to the DeepQA system 302 described above in FIG. 3.

The flow chart terminates at terminator block 618.

As described above, in an embodiment of the present invention, the answer key value in the answer key (e.g., "141") and the answer key value in the candidate passage (e.g., "141") are exact matches.

As described above, in an embodiment of the present invention, the answer key value in the answer key (e.g., "141") and the answer key value in the candidate passage have different values (e.g., "143") that are within a predefined range (e.g., within 2).

In an embodiment of the present invention, the method further comprises analyzing the certain type of question to determine a lexical answer type (LAT) for the certain type of question; matching the LAT to the candidate passage measurement unit; and selecting an answer to the certain type of question based on the matching of the LAT to the candidate passage measurement unit. For example, and with reference to FIG. 3, the question analysis in block 304 of the DeepQA system 302 analyzes the question to determine a lexical answer type (LAT) for that question. The LAT is a description of what type of information is being sought (e.g., landing speed of an aircraft and rudder control). The DeepQA system matches the LAT to the candidate passage measurement unit, and selects an answer to the certain type of question based on the matching of the LAT to the candidate passage measurement unit, as performed by the corpus search in block 306 and the answer generation in block 308.

In an embodiment of the present invention, the method further comprises assigning an uncertainty value of the answer key measurement unit matching the candidate passage measurement unit; and generating answers to the certain type of question utilizing terms that have the assigned uncertainty. That is, the DeepQA system 302 shown in FIG. 3 assigns an uncertainty value for how certain the DeepQA system is that the answer key measurement unit (e.g., "knots") and the candidate passage measurement unit (e.g., "KIAS") are both measurements of speed. Thus, assume that the DeepQA is only 70% certain that "KIAS" is also a measurement of speed. As such, any passage that has the answer key value along with a measurement unit that the DeepQA system is 70% sure also is a measurement of speed (e.g., "parsec"), then it will return that passage as a candidate answer. In this example, the answer would be wrong, since "parsec" is a measurement unit of distance, not speed. However, if many answers contained the phrase "141 parsecs", then the system might return those answers anyway. A subject matter expert (SME) would then remove "parsec" from the lexicon of speed measurement terms used by the DeepQA system.

In an embodiment of the present invention, the answer key utilizes one or more ground truth measurement units for the answer key measurement unit. For example, the answer key measurement unit could be "knots", which is derived from an aircraft instrument that produces speeds in the format of "X knots". This instrument output is referred to as a "ground truth", since it is observed and described ("grounded") in reality observations.

While the present invention is described for exemplary purposes as answering a question about rudder control on an aircraft, the scope of the present invention is not limited to rudder control questions, or even to aircraft questions. Rather, the present invention is applicable to any artificial intelligence based question answering system that encounters measurement units with which it is unfamiliar when retrieving answers to questions.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
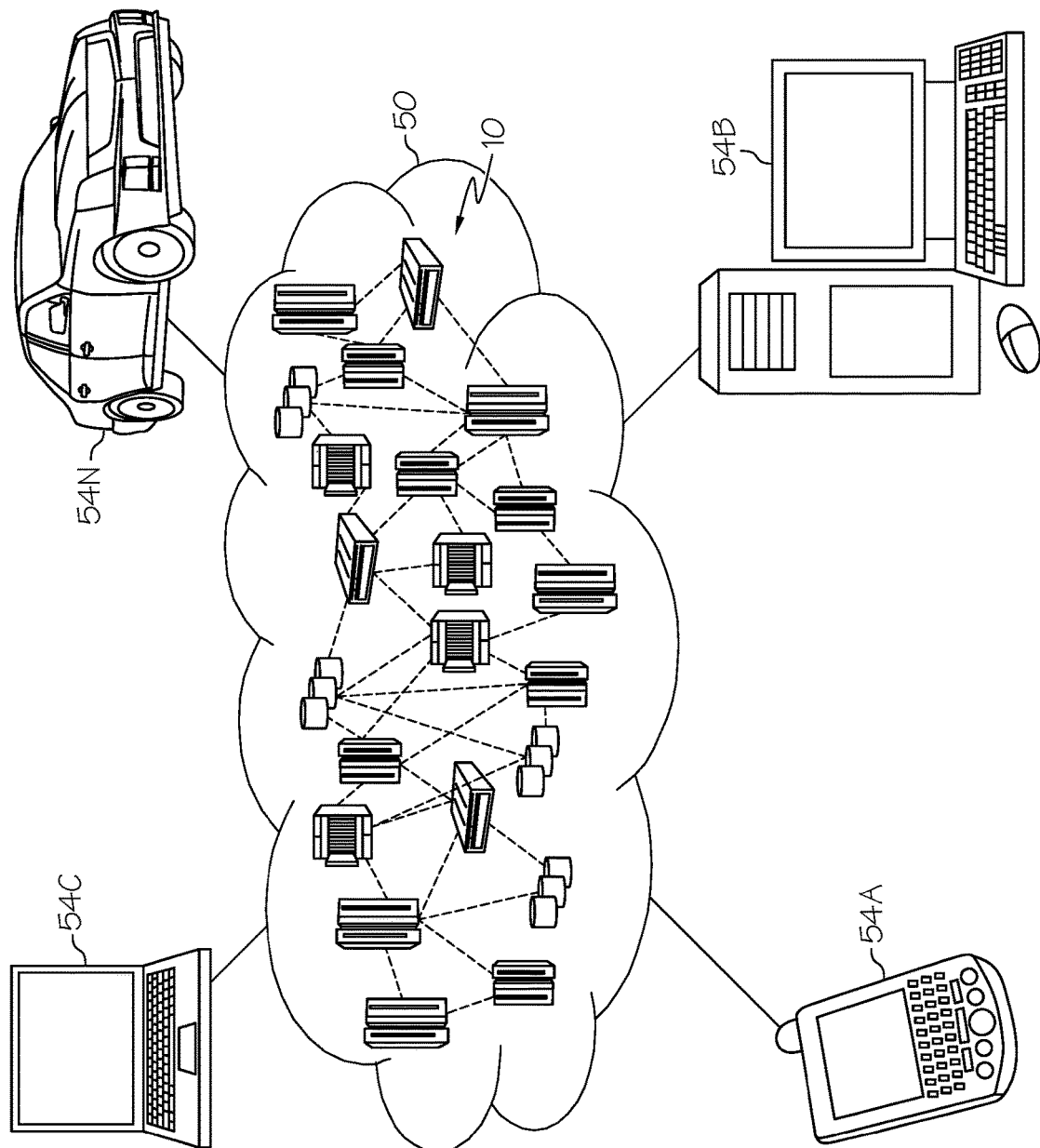
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
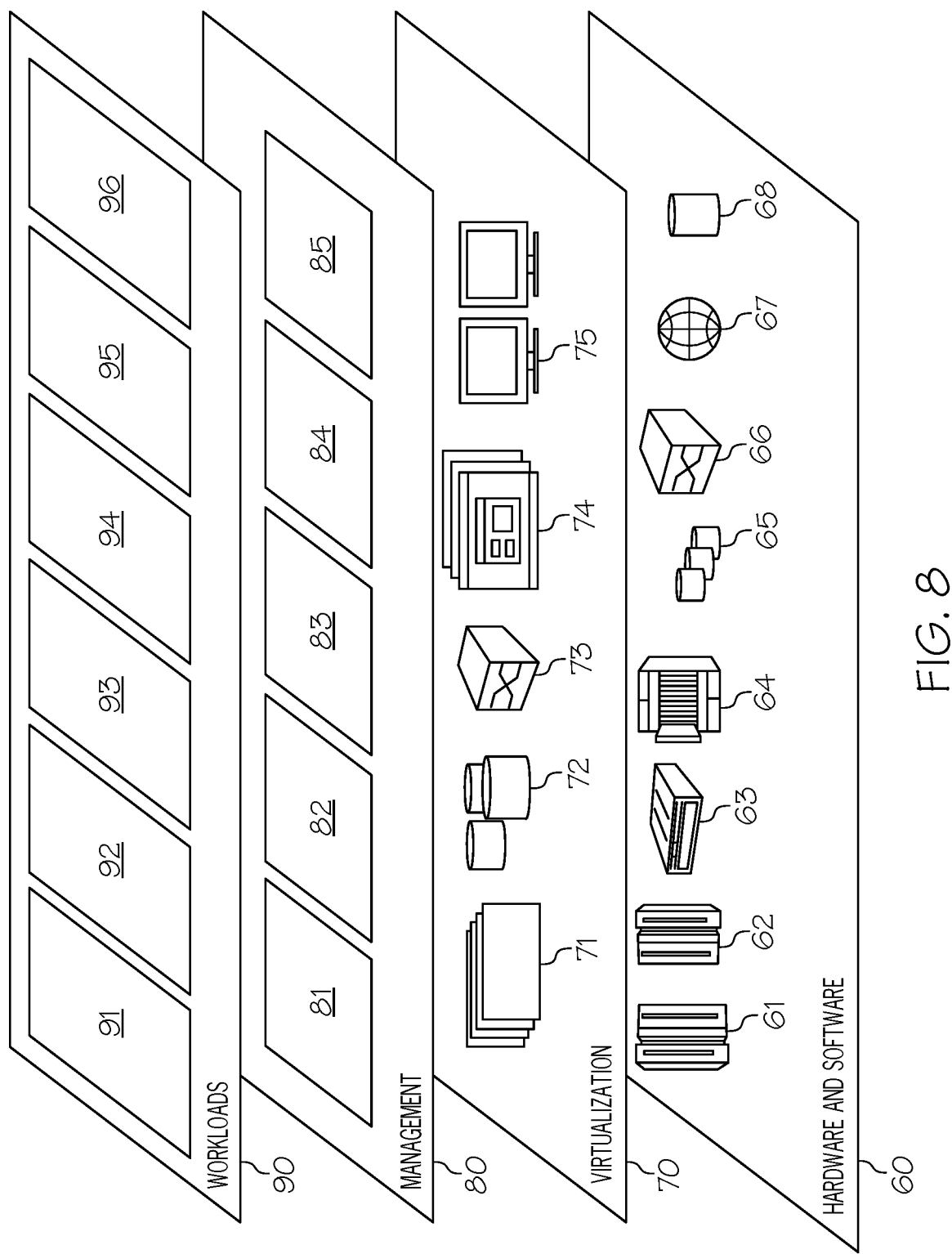
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and complex answer generation and utilization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   utilizing an answer key to train a deep question answering (DeepQA) system to search for passages that answer a certain type of question, wherein the DeepQA system outputs an answer key value and an answer key measurement unit that is associated with the answer key value;
   identifying a candidate answer that includes a candidate passage containing the answer key value but not the answer key measurement unit, wherein a candidate passage measurement unit in the candidate passage is associated with the answer key value, and wherein the candidate passage measurement unit is a measurement unit that is different from the answer key measurement unit;
   matching the answer key measurement unit to the candidate passage measurement unit based on the answer key measurement unit and the candidate passage measurement unit both being associated with the answer key value;
   retraining the DeepQA system to retrieve answers, for the certain type of question, that include one or more of the answer key measurement unit and the candidate passage measurement unit, wherein retrained DeepQA system controls a physical aircraft;
   receiving, by the retrained DeepQA system, the certain type of question;
   retrieving, by the retrained DeepQA system, a passage that includes the answer key value and one or more of the answer key measurement unit and the candidate passage measurement unit;
   answering, by the retrained DeepQA system, the certain type of question with the passage that includes the answer key value and one or more of the answer key measurement unit and the candidate passage measurement unit;
   recognizing, by the retrained DeepQA system, that the physical aircraft is flying below an identified minimum approach speed while landing, wherein the minimum approach speed is identified by the retrained DeepQA system, and wherein an auto-assist hydraulic system is required to control a rudder of the physical aircraft if the physical aircraft is flying below the identified minimum approach speed while landing; and
   in response to recognizing that the physical aircraft is flying below the identified minimum approach speed while landing, automatically activating, by the retrained DeepQA system, the auto-assist hydraulic system to control a rudder of the physical aircraft while the physical aircraft is landing.

2. The method of claim 1, wherein the answer key value in the answer key and the answer key value in the candidate passage are exact matches.

3. The method of claim 1, wherein the answer key value in the answer key and the answer key value in the candidate passage have different values that are within a predefined range.

4. The method of claim 1, further comprising:
   analyzing the certain type of question to determine a lexical answer type (LAT) for the certain type of question;
   matching the LAT to the candidate passage measurement unit; and
   selecting an answer to the certain type of question based on the matching of the LAT to the candidate passage measurement unit.

5. The method of claim 1, further comprising:
assigning an uncertainty value of the answer key measurement unit matching the candidate passage measurement unit; and
generating answers to the certain type of question utilizing terms that have the assigned uncertainty value.

6. The method of claim 1, wherein the answer key utilizes one or more ground truth measurement units for the answer key measurement unit.

7. A computer program product comprising a computer readable storage medium having program code embodied therewith, wherein the computer readable storage medium is not a transitory signal per se, and wherein the program code is readable and executable by a processor to perform a method comprising:
utilizing an answer key to train a deep question answering (QA) system to search for passages that answer a certain type of question, wherein the DeepQA system outputs an answer key value and an answer key measurement unit that is associated with the answer key value;
identifying a candidate answer that includes a candidate passage containing the answer key value but not the answer key measurement unit, wherein a candidate passage measurement unit in the candidate passage is associated with the answer key value, and wherein the candidate passage measurement unit is a measurement unit that is different from the answer key measurement unit;
matching the answer key measurement unit to the candidate passage measurement unit based on the answer key measurement unit and the candidate passage measurement unit both being associated with the answer key value;
retraining the DeepQA system to retrieve answers, for the certain type of question, that include one or more of the answer key measurement unit and the candidate passage measurement unit, wherein retrained DeepQA system controls a physical aircraft;
receiving, by the retrained DeepQA system, the certain type of question;
retrieving, by the retrained DeepQA system, a passage that includes the answer key value and one or more of the answer key measurement unit and the candidate passage measurement unit;
answering, by the retrained DeepQA system, the certain type of question with the passage that includes the answer key value and one or more of the answer key measurement unit and the candidate passage measurement unit;
recognizing, by the retrained DeepQA system, that the physical aircraft is flying below an identified minimum approach speed while landing, wherein the minimum approach speed is identified by the retrained DeepQA system, and wherein an auto-assist hydraulic system is required to control a rudder of the physical aircraft if the physical aircraft is flying below the identified minimum approach speed while landing; and
in response to recognizing that the physical aircraft is flying below the identified minimum approach speed while landing, automatically activating, by the retrained DeepQA system, the auto-assist hydraulic system to control a rudder of the physical aircraft while the physical aircraft is landing.

8. The computer program product of claim 7, wherein the answer key value in the answer key and the answer key value in the candidate passage are exact matches.

9. The computer program product of claim 7, wherein the answer key value in the answer key and the answer key value in the candidate passage have different values that are within a predefined range.

10. The computer program product of claim 7, wherein the method further comprises:
analyzing the certain type of question to determine a lexical answer type (LAT) for the certain type of question;
matching the LAT to the candidate passage measurement unit; and
selecting an answer to the certain type of question based on the matching of the LAT to the candidate passage measurement unit.

11. The computer program product of claim 7, wherein the method further comprises:
assigning an uncertainty value of the answer key measurement unit matching the candidate passage measurement unit; and
generating answers to the certain type of question utilizing terms that have the assigned uncertainty value.

12. The computer program product of claim 7, wherein the answer key utilizes one or more ground truth measurement units for the answer key measurement unit.

13. The computer program product of claim 7, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
utilizing an answer key to train a deep question answering (QA) system to search for passages that answer a certain type of question, wherein the DeepQA system outputs an answer key value and an answer key measurement unit that is associated with the answer key value;
identifying a candidate answer that includes a candidate passage containing the answer key value but not the answer key measurement unit, wherein a candidate passage measurement unit in the candidate passage is associated with the answer key value, and wherein the candidate passage measurement unit is a measurement unit that is different from the answer key measurement unit;
matching the answer key measurement unit to the candidate passage measurement unit based on the answer key measurement unit and the candidate passage measurement unit both being associated with the answer key value;
retraining the DeepQA system to retrieve answers, for the certain type of question, that include one or more of the answer key measurement unit and the candidate passage measurement unit, wherein retrained DeepQA system controls a physical aircraft;
receiving, by the retrained DeepQA system, the certain type of question;
retrieving, by the retrained DeepQA system, a passage that includes the answer key value and one or more of the answer key measurement unit and the candidate passage measurement unit;

answering, by the retrained DeepQA system, the certain type of question with the passage that includes the answer key value and one or more of the answer key measurement unit and the candidate passage measurement unit;

recognizing, by the retrained DeepQA system, that the physical aircraft is flying below an identified minimum approach speed while landing, wherein the minimum approach speed is identified by the retrained DeepQA system, and wherein an auto-assist hydraulic system is required to control a rudder of the physical aircraft if the physical aircraft is flying below the identified minimum approach speed while landing; and in response to recognizing that the physical aircraft is flying below the identified minimum approach speed while landing, automatically activating, by the retrained DeepQA system, the auto-assist hydraulic system to control a rudder of the physical aircraft while the physical aircraft is landing.

15. The computer system of claim 14, wherein the answer key value in the answer key and the answer key value in the candidate passage are exact matches.

16. The computer system of claim 14, wherein the answer key value in the answer key and the answer key value in the candidate passage have different values that are within a predefined range.

17. The computer system of claim 14, wherein the method further comprises:
analyzing the certain type of question to determine a lexical answer type (LAT) for the certain type of question;
matching the LAT to the candidate passage measurement unit; and
selecting an answer to the certain type of question based on the matching of the LAT to the candidate passage measurement unit.

18. The computer system of claim 14, wherein the method further comprises:
assigning an uncertainty value of the answer key measurement unit matching the candidate passage measurement unit; and
generating answers to the certain type of question utilizing terms that have the assigned uncertainty value.

19. The computer system of claim 14, wherein the stored program instructions are provided as a service in a cloud environment.

* * * * *